US012568312B2

(12) United States Patent
Xu et al.

(10) Patent No.: US 12,568,312 B2
(45) Date of Patent: Mar. 3, 2026

(54) MITIGATING ROLLING SHUTTER EFFECT USING AN ADJUSTABLE TRANSPARENCY LAYER

(71) Applicant: Adeia Imaging LLC, San Jose, CA (US)

(72) Inventors: Ning Xu, Irvine, CA (US); Toshiro Ozawa, Irvine, CA (US); Jean-Yves Couleaud, Mission Viejo, CA (US)

(73) Assignee: Adeia Imaging LLC, San Jose, CA (US)

( * ) Notice: Subject to any disclaimer, the term of this patent is extended or adjusted under 35 U.S.C. 154(b) by 40 days.

(21) Appl. No.: 18/805,793

(22) Filed: Aug. 15, 2024

(65) Prior Publication Data

US 2026/0052309 A1    Feb. 19, 2026

(51) Int. Cl.
*H04N 23/68* (2023.01)
*H04N 23/55* (2023.01)

(52) U.S. Cl.
CPC ........... *H04N 23/689* (2023.01); *H04N 23/55* (2023.01); *H04N 23/6812* (2023.01)

(58) Field of Classification Search
CPC ... H04N 23/689; H04N 23/6812; H04N 23/55
USPC ...................................... 348/208.1
See application file for complete search history.

(56) References Cited

U.S. PATENT DOCUMENTS

| | | | | | |
|---|---|---|---|---|---|
| 7,532,236 | B2 * | 5/2009 | Yamamoto | ........... | H04N 23/689 |
| | | | | | 348/208.6 |
| 9,380,220 | B2 * | 6/2016 | Davis | ........... | G03B 7/00 |
| 10,097,769 | B2 * | 10/2018 | Tanaka | ........... | H04N 23/741 |
| 11,516,378 | B2 * | 11/2022 | Cui | ........... | H04N 25/134 |
| 11,743,607 | B2 * | 8/2023 | Kobayashi | ........... | H04N 25/44 |
| 11,765,472 | B2 * | 9/2023 | Barkan | ........... | H04N 25/42 |
| | | | | | 348/222.1 |
| 12,058,461 | B2 * | 8/2024 | Kim | ........... | H04N 25/50 |
| 2006/0033966 | A1 | 2/2006 | Yamamoto et al. | | |
| 2014/0300805 | A1 * | 10/2014 | Davis | ........... | H04N 23/55 |
| | | | | | 348/362 |
| 2016/0381270 | A1 * | 12/2016 | Davis | ........... | H04N 23/73 |
| | | | | | 348/362 |
| 2017/0085769 | A1 * | 3/2017 | Tanaka | ........... | H04N 23/741 |
| 2018/0146125 | A1 * | 5/2018 | Davis | ........... | H04N 23/55 |
| 2023/0063717 | A1 * | 3/2023 | Barkan | ........... | H04N 23/55 |
| 2023/0138770 | A1 | 5/2023 | Kim et al. | | |
| 2023/0370712 | A1 * | 11/2023 | Takahashi | ........... | H04N 23/63 |
| 2024/0406594 | A1 | 12/2024 | Kobayashi | | |
| 2025/0203239 | A1 * | 6/2025 | Xu | ........... | H04N 25/57 |

OTHER PUBLICATIONS

Basler, "CMOS Global Shutter Cameras", available online at: <https://www.baslerweb.com/en-us/learning/cmos-global-shutter-cameras/>, retrieved on Aug. 20, 2024 (7 pages).

(Continued)

*Primary Examiner* — Pritham D Prabhakher

(74) *Attorney, Agent, or Firm* — HG LAW LLP

(57) ABSTRACT

Systems and methods are described for correcting rolling shutter effect for images captured by a camera. In some embodiments, an adjustable transparency layer is placed between an image sensor and a camera lens, where the adjustable transparency layer is controlled to become transparent and then opaque in order to produce a single concurrent effective exposure time, reducing rolling shutter effect.

20 Claims, 10 Drawing Sheets

(56) References Cited

OTHER PUBLICATIONS

Grundmann, et al., "Calibration-free rolling shutter removal", 2012 IEEE International Conference on Computational Photography (ICCP) (2012) (8 pages).

Lao, et al., "A Robust Method for Strong Rolling Shutter Effects Correction Using Lines With Automatic Feature Selection", Proceedings of the IEEE Conference on Computer Vision and Pattern Recognition (CVPR), pp. 4795-4803 (2018).

Muthu, "Global Motion Estimation Techniques for Compensation of Rolling Shutter Effect", Seventh IEEE, IET International Symposium on Communication Systems, Networks and Digital Signal Processing (CSNDSP) (Jul. 2010) (7 pages).

Nasir, et al., "Polymer-dispersed liquid-crystal-based switchable glazing fabricated via vacuum glass coupling", RSC Advances, 10(53):32225-32231 (2020).

Rengarajan, et al., "Unrolling the Shutter: CNN to Correct Motion Distortions", Proceedings of the IEEE Conference on Computer Vision and Pattern Recognition (CVPR), pp. 2291-2299 (2017).

Sony, "Alpha 9 featuring full-frame stacked CMOS sensor", Inspired worlds wait to be revealed, available online at: <https://www.sony.com/ug/electronics/interchangeable-lens-cameras/ilce-9>, retrieved on Aug. 21, 2024 (21 pages).

* cited by examiner (a) Global Shutter Exposure (b) Rolling Shutter Exposure

Mid-Exposure Time for Each Row

1000

1004

1006 Processing Circuitry

1008 Storage

1010 Sensor Controller

1012 Pixel Array

1014 Adjustable Transparency Layer

1016 Motion Sensors

MITIGATING ROLLING SHUTTER EFFECT USING AN ADJUSTABLE TRANSPARENCY LAYER

BACKGROUND

This disclosure is directed to systems and methods for capturing images, e.g., in a manner that mitigates rolling shutter effect for images captured by a camera. For instance, a method for reducing rolling shutter effect can be implemented by a camera that is determined to be moving relative to an object within a captured scene.

SUMMARY

Modern camera image sensors are often configured to operate as efficiently as possible within given constraint parameters, such as minimizing size and manufacturing costs of the image sensors while maintaining high output image quality. Complementary metal-oxide semiconductor (CMOS) image sensors are widely used in digital photography and are commonly coupled with a rolling shutter mechanism, where image data is read from the image sensor line by line in sequential order. Because of a time delay in exposure caused by the line-by-line data transfer, distortions can appear in an output image generated by the received image data. A typical example of such distortions, known as the "rolling shutter effect," includes the slanted depiction of a vertical pole (see FIG. 3) when captured by a relatively horizontal moving camera using a rolling shutter, such as where the camera is being operated by a user onboard a train passing the pole. If the camera is moving from left to right during an exposure and the rolling shutter captures image data from a top row to a bottom row, the top of the pole will appear to slant toward the right side of a frame and the bottom of the pole will be depicted slanted toward the left side of the frame. Additionally, fast-moving objects, such as a tennis racket mid-swing hitting a tennis ball, will appear curved toward the outer, and faster-moving, edge of the racket, where the ball and racket may have different types of motion, such as the ball moving relatively straight from right to left, and the racket rotating from right to left. It is often preferable to correct such effect to produce an image of a scene without any visible distortions.

FIG. 3 shows an illustrative diagram of example images displaying rolling shutter effect and time graphs indicating sensor exposure times. As shown in FIG. 3, an image 302 captured by a sensor configured to operate using a global shutter depicts an object in motion, such as a passenger train, without noticeable distortions. The global shutter is a shutter that begins and ends exposure of the entire image sensor at the same time. Exposure time graph 306 represents a plurality of sensor rows 308a-308n and the associated exposure time for each of the sensor rows. As shown in the exposure graph 306, the exposure for each of the plurality of rows 308a-308n begins at a first time 310 and ends at second time 312. Thus, each of the plurality of rows 308a-308n is exposed to incoming light simultaneously, resulting in a non-distorted image 302.

In contrast, image 320 captured by a sensor configured to operate using a rolling shutter depicts an object in motion, such as a passenger train, with noticeable skew distortion showing the top of the train leaning toward the right side of the frame and the bottom of the train leaning toward the left side of the frame. Image 322 further highlights the skewed distortion caused by a rolling shutter, where objects closer to the image sensor, such as vertical pole 324, skew more heavily than objects farther away from the image sensor, such as vertical design components 326 on a distant building.

Exposure time graph 330 represents a plurality of sensor rows 332a-332n and the associated exposure time for each of the sensor rows for a rolling shutting exposure. The exposures for each of the plurality of rows 332a-332n are staggered over time. For example, row 332a of the image sensor begins an exposure time at time t and ends the exposure time at tte, where e is the exposure length. Row 332b begins an exposure time at t+x and end the exposure time at t+x+e, where x is a time shift as the rolling shutter proceeds to expose each subsequent sensor row. As each sensor row is exposed to light from a scene at exposure start times and end times that are offset from previous and subsequent sensor rows, the resulting image will display skew distortions for objects that are captured while there is relative motion between the object and the image sensor. Returning to illustrative image 322, a scene is captured by a camera moving relative to the vertical pole 324 from the left side of the frame to the right, e.g., the camera is located on a passenger train traveling, in the scene direction, from left to right. Coupled with a rolling shutter, the resulting image depicts a skewed vertical pole 324. This is caused by the top of the vertical pole 324 being exposed initially while the camera is located further to the left of the scene, e.g., corresponding to image sensor row 332a, and the bottom of the vertical pole 324 being exposed later while the camera located further to the right of the scene, e.g., corresponding to image sensor row 332n.

According to embodiments disclosed herein, correcting distortions resulting in the rolling shutter effect include using a rolling shutter coupled with an image sensor while controlling the effective exposure time of the image sensor portions to reduce or eliminate the skewed appearance of captured objects.

One approach to correcting the rolling shutter effect is replacing the rolling shutter and implementing a global shutter in its place, where all received sensor data is read simultaneously, such as by using a charge-coupled device (CCD) camera, which are commonly configured to operate using a global shutter. A global shutter will have all rows or columns of pixels of an image sensor exposed for the same time period in contrast to a rolling shutter that will expose the rows or columns of pixels one by one with a time delay between the start exposure time of each row or column of pixels. One constraint of the time delay in rolling shutter configurations is the required readout time of each row or column, used to process the capture image data, cannot overlapped a readout time of another row or column, as many sensors are only configured to process a single line buffer to hold the data samples for output to a controller or further processing unit in order to save the space and cost. However, global shutters are more costly and complex to manufacture and often introduce compromises in sensor sensitivity and resulting image quality. Thus, an economical solution to correct rolling shutter effect that additionally maintains image quality is desirable.

In another approach, faster readout speeds have been attempted in order to reduce the readout time and mitigate rolling shutter effect. However, faster readout speeds can lead to increased power consumption and heat generation.

In yet another approach, a pseudo-global shutter is replicated with CMOS sensors and a rolling shutter by adding a triggered light source, such as a speedlight flash. The staggered exposure times of the sensor rows or sensor columns do not create a rolling shutter effect due to the short duration of the triggered light source that briefly illuminates a scene during a period when all or a majority of the rows or columns are exposed. However, this approach requires use of such a triggered light source, which is not always available or powerful enough to properly expose a scene.

To help address these problems, the embodiments disclosed herein include methods, systems, and apparatuses for correcting rolling shutter effect in image capturing. In one embodiment, the disclosed techniques produce a pseudo-global shutter by introducing an intermediate adjustable transparency layer between an image sensor and a lens of a camera. The rolling shutter consecutively exposes, with exposure time overlap, a plurality of sensor portions to incoming light over an actual exposure time, and the adjustable transparency layer is controlled to become transparent and then opaque in order to produce a single concurrent effective exposure time. Thus, a simultaneous exposure across each of the plurality of sensor portions is achieved without the need for a global shutter, faster readout speeds, or a triggered light source.

In some embodiments, the adjustable transparency layer is a layer of polymer-dispersed liquid crystals (PDLC) disposed between the image sensor and a camera lens. Alternative materials that are configured to be able to switch opacity properties on and off within a fraction of an exposure interval may be used in place of PDLC.

In some embodiments, a reset time of each sensor portion is synchronized and initiated concurrently, and an earliest readout time of a sensor portion of each of the sensor potions of the image sensor is determined. The period in which the adjustable transparency layer is made to be transparent, and therefore allow light to reach each of the sensor portions, is determined based on the beginning of the reset time and the earliest readout time of all of the sensor portions. During the period in which the adjustable transparency layer is made to be opaque, light is obstructed from reaching one or more of the sensor portions.

In an embodiment, each of the sensor portions are configured to record incoming light during an exposure interval and the exposure interval for each of the sensor portions is preceded by a reset time and followed by a readout time. The earliest readout time of each of the readout time of the sensor portions is determined, and the adjustable transparency layer is made to be opaque simultaneous with, or earlier than, the determined earliest readout time.

In an embodiment, a transmittance rate of incoming light is determined and compared to a predefined threshold. Once it is determined that the transmittance rate exceeds the predefined threshold, a reset control is issued to each of the plurality of sensor portions, and a simultaneous exposure across the entire sensor is initiated.

In an embodiment, the adjustable transparency layer in synchronized by an image sensor controller, causing each of the plurality of sensor portions to simultaneously begin a start exposure time and causing the adjustable transparency layer to become transparent at the start exposure time.

In a further embodiment, preview images of a current scene are received and analyzed to determine a relative motion direction between a camera and a scene, and an optimal scanning direction of the image sensor portions to minimize rolling shutter effect of a plurality of scanning directions is determined. For example, a top-to-bottom vertical scanning direction may be determined to produce the least amount of rolling shutter effect in a resulting output image compared to a bottom-to-top vertical scanning direction, a left-to-right horizontal scanning direction, or a right-to-left horizontal scanning direction.

In an embodiment, the plurality of sensor portions comprise a plurality of sensor rows or a plurality of sensor columns, and the scanning direction employs a scanning direction along the sensor rows or along the sensor columns.

In some embodiments, the relative motion between the camera and the captured scene is further determined based on additional motion sensors, such as accelerometers, LIDAR sensors, or event cameras that are distinct from the image sensor. The relative motion can be determined to be predominantly in a horizontal direction, e.g., left to right or right to left, or a vertical direction, e.g., top-to-bottom or bottom-to-top, and the scanning direction of the image sensor is determined based on the predominant relative motion direction.

In a further embodiment, an object in motion is identified in a preview image and optimal exposure times are calculated for each of a plurality of sensor portions of the image sensor. Sensor portions of the image sensor capturing the object in motion are configured to have shorter exposure times than sensor portions not capturing the object in motion. A midpoint of each of the calculated optimal exposure times is determined, and each of the sensor portions is exposed according to an aligned midpoint exposure time. In a further embodiment, an exposure time that minimizes the differences between a plurality of midpoints of each of the sensor portion exposure times is selected and transmitted to an image sensor controller for image capture.

In further embodiments, additional image processing is performed on the image data in conjunction with any of the methods discussed herein to further reduce rolling shutter effect and other image distortions introduced during the image capture process.

Thus, the disclosed embodiments offer methods, systems, and apparatuses for correcting or minimizing rolling shutter effect in images captured using a rolling shutter while maintaining the lower cost and higher sensor sensitivity compared to a global shutter implementation.

BRIEF DESCRIPTION OF THE DRAWINGS

The present disclosure, in accordance with one or more various embodiments, is described in detail with reference to the following figures. The drawings are provided for the purposes of illustration only and merely depict typical or example embodiments. These drawings are provided to facilitate an understanding of the concepts disclosed herein and should not be considered limiting of the breadth, scope, or applicability of these concepts. It should be noted that, for clarity and ease of illustration, these drawings are not necessarily made to scale.

DETAILED DESCRIPTION

Figure 1:
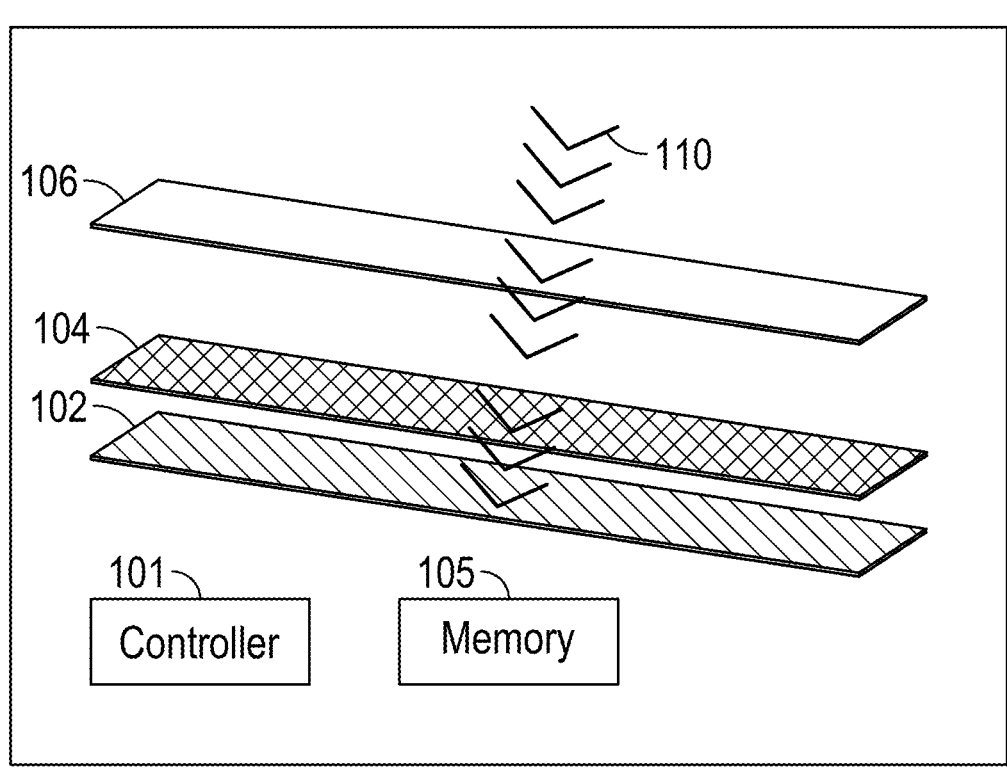
FIG. 1 shows an illustrative diagram of an arrangement of components of a camera, including a lens, an adjustable transparency layer, and an image sensor layer, in accordance with some embodiments of this disclosure.

FIG. 1 shows an illustrative diagram of an arrangement of components of a camera, including a lens, an adjustable transparency layer, and an image sensor layer, in accordance with some embodiments of this disclosure. As shown in FIG. 1, a simplified arrangement of components of camera 100 includes an adjustable transparency layer 104 that is disposed within an optical path 110 between a camera lens 106 and an image sensor 102. In some embodiments, adjustable transparency layer 104 may be placed on a top of image sensor 102, e.g., on a surface of image sensor 102 that is closer to incoming light. The adjustable transparency layer 104 can be electrically connected to a controller 101 configured to cause the adjustable transparency layer 104 to switch between an opaque state and a transparent state to modulate light transmission between the lens 106 and the image sensor 102. In an embodiment, the controller 101 is configured to synchronize the adjustable transparency layer 104 with a readout process of the image sensor 102 to precisely control when the adjustable transparency layer 104 is switched between an opaque state and a transparent state in relation to when the image sensor 102 is capturing a scene. In some embodiments, adjustable transparency layer 104 may be used as a filter. In this description, the term 'camera' includes any device configured to capture data that may be used to create an image.

In an embodiment, image sensor 102 is made up of a plurality of pixels that are each arranged in a front illuminated configuration, where light sensitive portions are placed adjacent to imaging circuitry within each pixel. The imaging circuitry processes data received from the light sensitive portions. In an alternative embodiment, the plurality of pixels are arranged in a back illuminated configuration, where the imaging circuitry is placed behind the light sensitive region of each pixel. Such a configuration allows for a proportionally larger light sensitive area per pixel that is exposed to incoming light compared to a front illuminated configuration.

The camera 100 may comprise one or more image sensors 102, e.g., a charge-coupled device (CCD), a complementary metal-oxide semiconductor (CMOS), any other suitable sensor (e.g., optical sensor), or any suitable combination thereof. Image sensor 102 may detect received light, which may be focused towards image sensor 102 via lens 106, and generate image data based on the detected light by converting the detected light comprising photons into electrical signals. Lens 106 may be any suitable type of lens, and may comprise any suitable number of lenses which may correspond to one or more of any suitable type of lens, e.g., ophthalmic lenses such as a concave lens or convex lens. In some embodiments, camera components of camera 100 may further comprise a camera direction sensor element, such as, for example, an accelerometer, a motion sensor, an inertial measurement unit (IMU), or any other suitable device for detecting directional motion of the camera within three-dimensional space, or any other suitable components, or any suitable combination thereof. In an embodiment, the camera is further connected to additional sensors, such as a light detection and ranging (LIDAR) sensor or an event camera, for capturing additional data, e.g., preview images, for image analysis to determine a direction of motion of the camera as further discussed below. The camera may include an image camera, a video camera, or a camera configured to capture both image and video, or any other suitable camera.

In an embodiment, adjustable transparency layer 104 is comprised at least in part of polymer-dispersed liquid crystals (PDLC). In further embodiments, the adjustable transparency layer 104 is comprised of a material having properties that allow an ultra-fast switching time between an opaque state and a transparent state.

Figure 2:
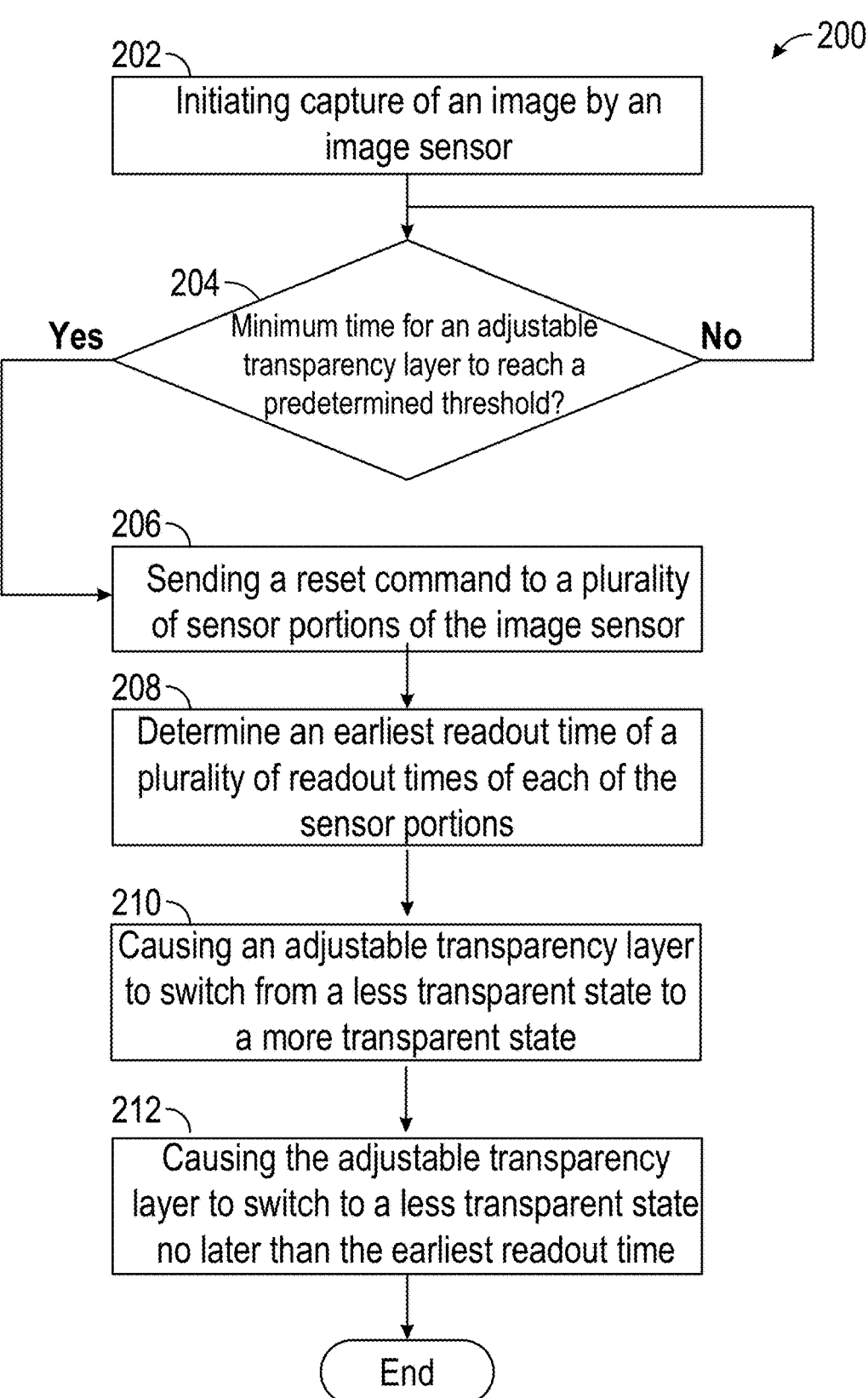
FIG. 2 is a flowchart of a process for switching an adjustable transparency layer between an opaque state and a transparent state, in accordance with some embodiments of this disclosure.
Figure 3:
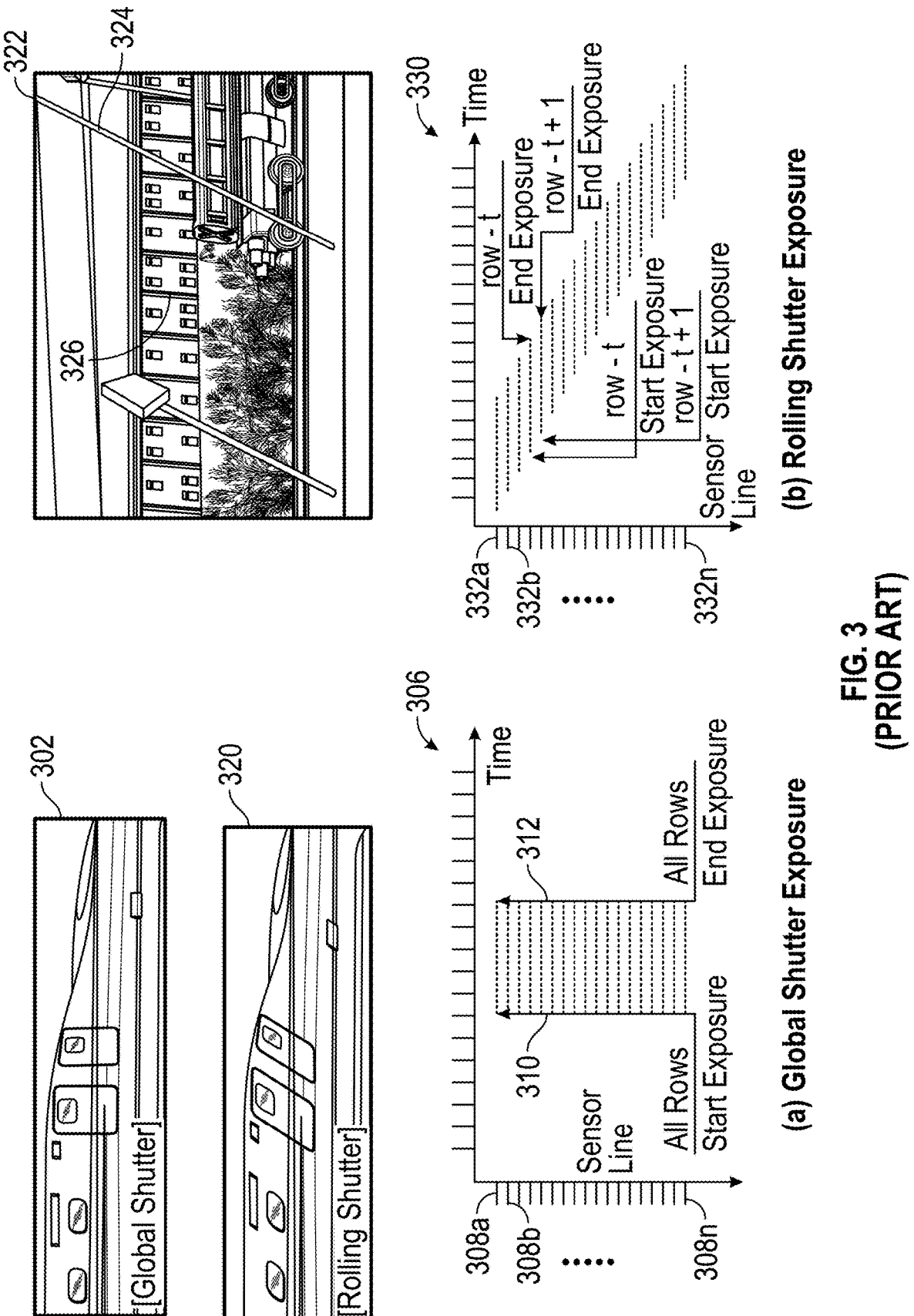
FIG. 3 shows an example in the prior art of images having rolling shutter effect and time graphs indicating sensor exposure times.

FIG. 2 is a flowchart of a process 200 for switching an adjustable transparency layer between an opaque state and a transparent state, in accordance with some embodiments of this disclosure. The process may be performed by a controller, e.g., controller 101 of FIG. 1, processing circuitry of a camera or a computing device, or any apparatus or system configured to control an adjustable transparency layer of a camera.

At 202, the process begins by initiating a capture of an image by an image sensor. In an embodiment, the capturing of an image is performed by a dedicated mirrorless or single lens reflex (SLR) camera, a personal user device containing a camera, such as a camera-equipped smartphone or wearable device, and the like. The initiation of capturing an image may be triggered by turning a camera to an on state, opening up a camera application, sending a command from a controller to initiate an image capture sequence, and the like.

In an embodiment, at 204, it is determined if a minimum time for the adjustable transparency layer to reach a predetermined threshold of transparency has elapsed. If the determined minimum time for the adjustable transparency layer to reach a predetermined threshold of transparency has elapsed, the process continues at 206 where a reset command is sent, e.g., by controller 101 of FIG. 1, to a plurality of sensor portions of an image sensor. If the minimum time has not elapsed, the process returns to 204 and repeats the determination of whether the minimum time for the adjustable transparency layer to reach a predetermined threshold of transparency has elapsed. In an embodiment, the reset command is issued to all of the sensor potions, e.g., the sensor rows or sensor columns, simultaneously.

At 208 an earliest readout time of a plurality of read times for each of the plurality of sensor portions is determined. At 210, the transparency level of the adjustable transparency layer is adjusted to allow incoming light to reach the plurality of sensor portions. In some embodiments, a controller will trigger the adjustable transparency layer to allow incoming light, either by becoming fully transparent or partially transparent, only after all rows or all columns have completed a reset command without any synchronization between the plurality of sensor portions and the adjustable transparency layer. In other embodiments, a controller is configured to synchronize each of the plurality of sensor portions with the adjustable transparency layer such that a transition from a less transparent state to a more transparent state is synchronized with the reset commands of the plurality of sensor portions, ensuring that all rows of the sensor are exposed to the incoming light for an equal duration. In an embodiment, the controller is configured with an interface to adjust the synchronization timing, allowing for compatibility with various sensor types, each having different readout times.

At 212, the controller triggers the adjustable transparency layer to switch to a less transparent, of fully opaque, state wherein the switch to a less transparent state occurs no later than the earliest readout time of any of the plurality of sensor portions, effectively 'closing' a shutter of the image sensor, concurrently with or prior to the earliest readout time of the plurality of sensor portions.

Figure 4:
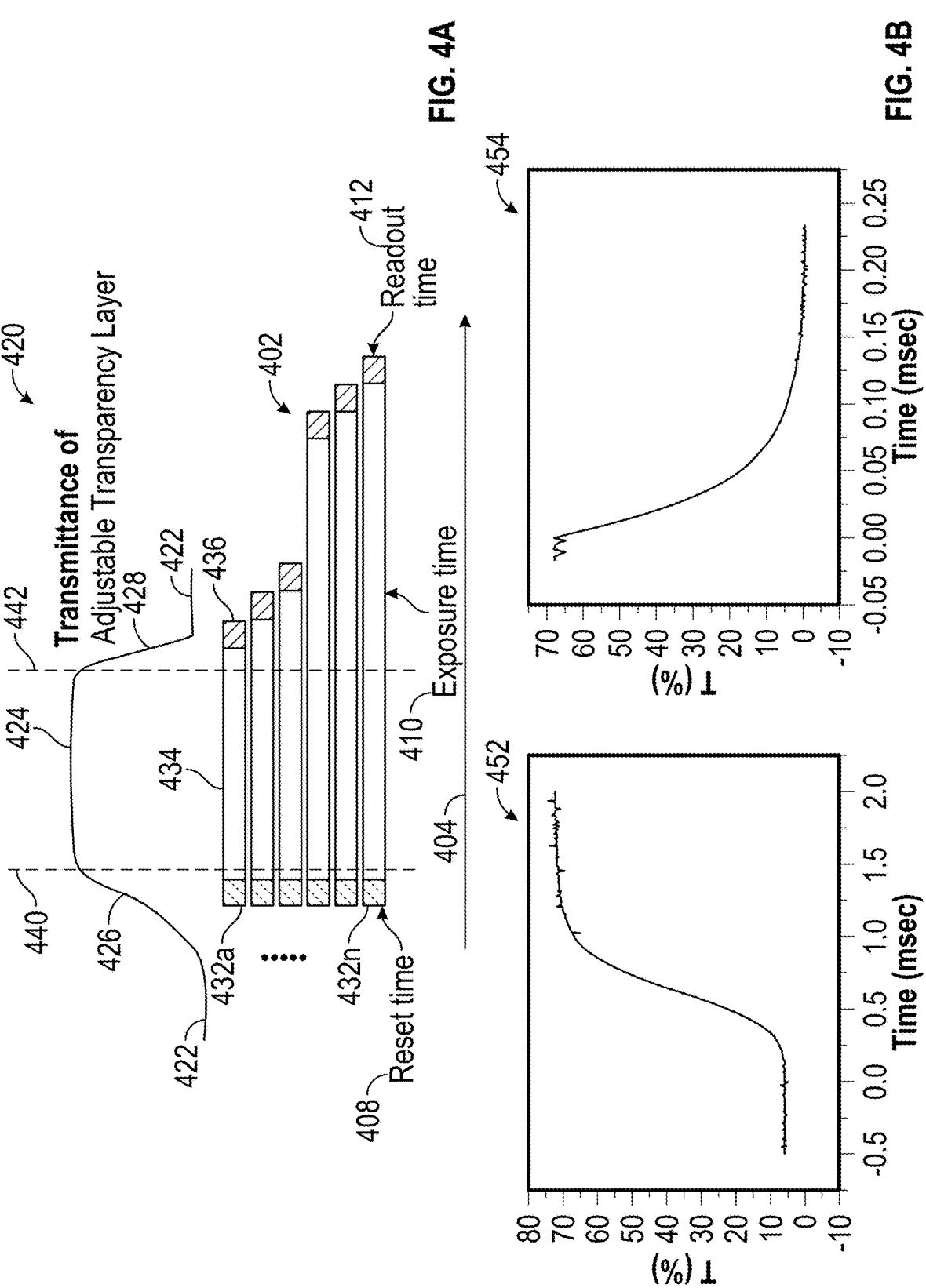
FIG. 4A shows illustrative exposure graphs of image sensor portions with respect to time, in accordance with some embodiments of this disclosure.
FIG. 4B shows illustrative activation and deactivation graphs of an adjustable transparency material, in accordance with some embodiments of this disclosure.

FIG. 4A shows illustrative exposure graphs of image sensor portions, in accordance with some embodiments of this disclosure. The exposure graph 402 shows a plurality of sensor rows, line 1 432a to line n 432n, collectively sensor rows 432, as plotted against a timeline 404. In an embodiment, the timeline each of the sensor rows 406 includes a reset command 408. The reset command is received from a sensor controller (e.g., controller 101 of FIG. 1) and causes each sensor row of pixels of image sensor 102 to initiate a reset to prepare for the exposure step, e.g. to ensure no remnant discharge remains within the sensor row.

Following the reset command, controller 101 causes each row to begin an exposure step 410 where incoming light is received. At the conclusion of the exposure step, each sensor row performs a readout step 412 where the data received during the exposure step is transmitted to the controller 101 for further processing. In an embodiment, and discussed further below relating to FIG. 7, image sensor 102 may include additional processing components such as, for example, address generators, address decoders, one or more analog-to-digital converters and row and column scanners, and/or any other suitable components, for processing of the data from the readout step.

In an embodiment, controller 101 causes adjustable transparency layer 104 to become transparent immediately after the reset command is received, and become opaque no later than that start of the earliest readout step. Once the adjustable transparency layer returns to an opaque state, no additional incoming light is received by the rows of the image sensor. As shown in the area between the start of the exposure time 440 and the start of the earliest readout time 442, the period of transparency of the adjustable transparency layer provides an effective exposure that is equal in duration and start and end times for all of the plurality of sensor rows 432.

FIG. 4A further shows an illustrative sensor portion exposure graph alongside a graphed transmittance value of an adjustable transparency layer, in accordance with some embodiments of this disclosure. The transmittance level 420 represents the opacity and transparency of the adjustable transparency layer, where a low value 422 corresponds to opacity and a high value 424 represents transparency. The slope 426 is indicative of how quickly the adjustable transparency layer can transform from an opaque state to a transparent state, and the slope 428 is indicative of how quickly the adjustable transparency layer can transform from a transparent state to an opaque state. In some embodiments, controller 201 may trigger adjustable transparency to become transparent, then after the transmittance rate becomes high enough (e.g., exceeds a threshold), controller

201 may issue the reset control to all rows (or columns) or other suitable portions of image sensor 202.

As shown by the dotted line 440, the end of a switch-on time of adjustable transparency layer 104 is aligned at or near to the end of the reset step. Similarly, the dotted line 422 indicates that the beginning of a switch-off time of the adjustable transparency layer is aligned at or near the beginning of the earliest readout time 436 of all of the plurality of sensor rows 432a-432n. determining the earliest readout time by comparing the readout times of each respective sensor portion of the plurality of sensor portions.

FIG. 4B shows illustrative activation and deactivation graphs of an adjustable transparency material, in accordance with some embodiments of this disclosure. In order for the adjustable transparency material, e.g., adjustable transparency material 104 of FIG. 1, to be configured for use in reducing or eliminating rolling shutter effect, a material with properties that allow ultra-fast switching times is required. For example, illustrative material having a "switch on" time of approximately 1 milliseconds (ms) and a "switch off" time of approximately 0.1 ms is shown in graph 302.

Figure 5:
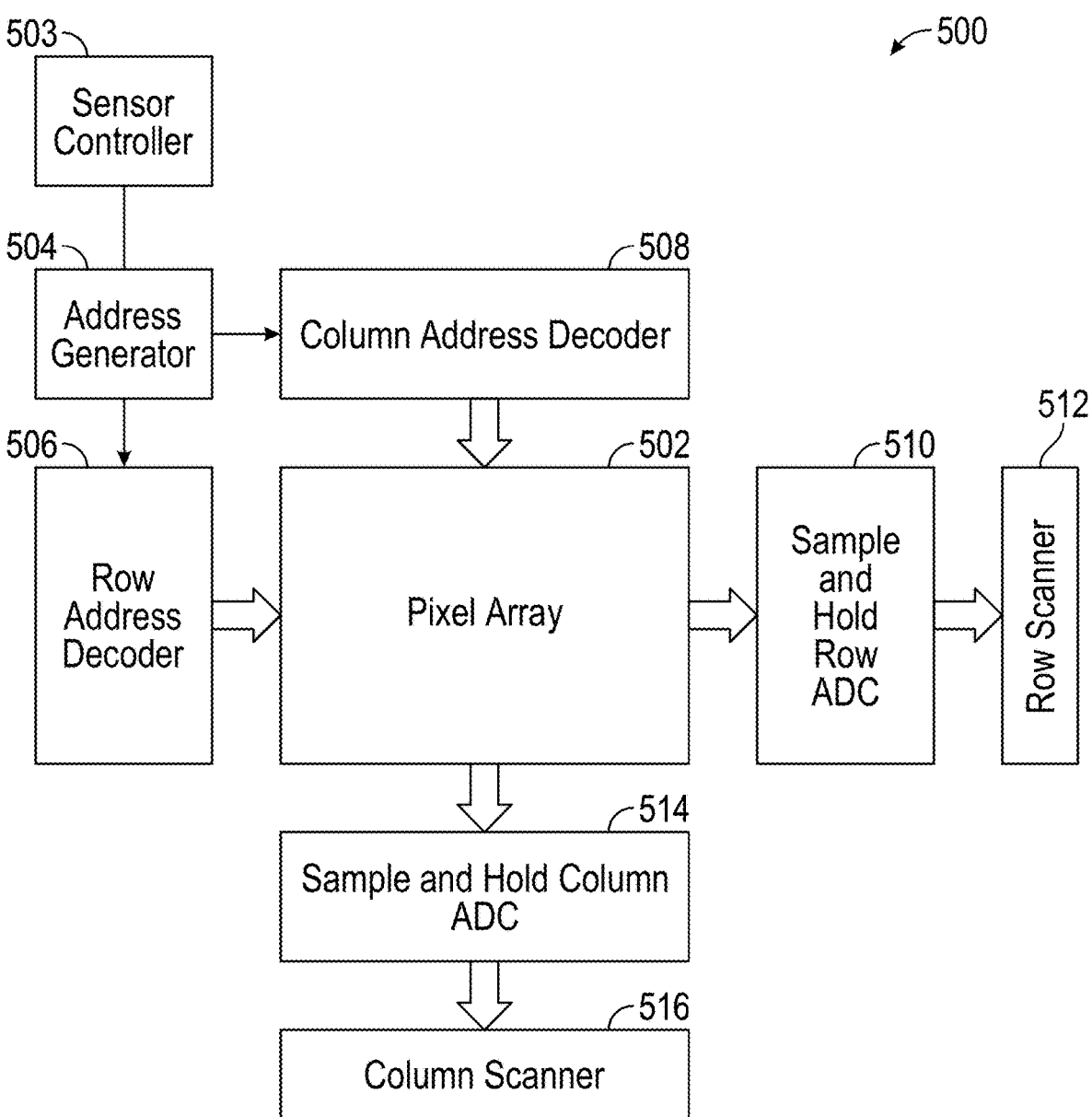
FIG. 5 depicts an illustrative diagram of an image sensor architecture for scanning an image sensor in either a row-by-row or a column-by-column manner, in accordance with some embodiments of this disclosure.

FIG. 5 depicts an illustrative diagram of an image sensor architecture 500 for scanning an image sensor in either a row-by-row or a column-by-column manner, in accordance with some embodiments of this disclosure.

In an embodiment, implementing the method 600 of FIG. 6 discussed below will result in an output image with reduced rolling shutter effect but may introduce compression or extension artifacts within the output image in the direction of the horizontal or vertical motion of a camera. In order to compensate for the reduced rolling shutter effect, in an embodiment, the reset time order for each portion of the image sensor is based on the motion direction. For example, if the relative motion is determined to be horizontal motion from left to right, a column-by-column scan can be switched to capture from right to left, so that the rolling shutter effect will be compressed, and thus the rolling shutter effect can be compensated for without revealing a black hole in the background.

As shown in FIG. 5, in an embodiment the image sensor architecture 500 is modified to include column and row addressing circuitry to enable independent exposure control of each column of the image sensor. An address generator 504 is configured to receive instructions from a sensor controller 503 and determine if a row scanning pattern or a column scanning pattern is to be implemented. The sensor controller 503 may correspond to the sensor controller 1010 of FIG. 10. A row address decoder 506 and a column address decoder 508 are connected to the address generator 504, and are configured to relay the direction of sensor scanning to be used during image capture to the pixel array 502 of the image sensor. For image sensor row scanning, row-wise line buffers and row analog-to-digital converters (ADCs) 510 are connected to the pixel array 502 and are configured to receive data from each of the rows of the pixel array 502, e.g., sample and hold the row data, and send the row data to a row scanner 512 for final image processing. For image sensor column scanning, column-wise line buffers and column analog-to-digital converters (ADCs) 514 are connected to the pixel array 502 and are configured to receive data from each of the columns of the pixel array 502, e.g., sample and hold the column data, and send the column data to a column scanner 516 for final image processing.

In an embodiment, a real-time motion analysis is performed on preview images received in preparation for a final image capture. As discussed in the method of FIG. 6, preview images are received and analyzed to determine a relative motion between the camera and the scene. An image analysis algorithm is used to identify and analyze motion in the received preview images. The analysis includes a determination of a predominant relative direction of motion of the camera, as discussed further below, and is further used to select an optimal scanning direction for reducing rolling shutter effect.

Based on the analysis and determined optimal sensor scanning direction, the image sensor is configured to select one of four options of image sensor scanning directions: (1) a vertical scanning direction comprising scanning horizontal rows of the image sensor from a top row to a bottom row, (2) a vertical scanning direction comprising scanning horizontal rows of the image sensor from a bottom row to a top row, (3) a horizontal scanning direction comprising scanning vertical columns of the image sensor from a left column to a right column, and (4) a horizontal scanning direction comprising scanning vertical columns of the image sensor from a right column to a left column.

In an embodiment, an image sensor controller is configured to dynamically adjust the scanning sequence based on a determined relative direction of motion. Additionally, exposure length and reset time commands can be adjusted to reduce unwanted artifacts in an output image. For example, selecting a shorter exposure time and aligning reset time commands for each column or each row can reduce skewed or warped artifacts in an output image. In yet another embodiment, post-processing algorithms are used to correct any compression or expansion in the output image due to the applied scanning adjustments.

In some embodiments, the post-processing includes correcting rolling shutter effect through computational methods including analyzing the captured images or videos to detect and correct distortions due to the sensor's sequential exposure of rows or columns. These methods can be broadly categorized into geometric corrections, where distortions are corrected by warping the image, and machine learning (ML) approaches that train an ML model to recognize and correct rolling shutter artifacts. Correction algorithms may include global motion estimation and block matching algorithms, such as exhaustive search, three step search, new three step search, simple and efficient search, four step search, diamond search, adaptive rood pattern search, and the like.

Figure 6:
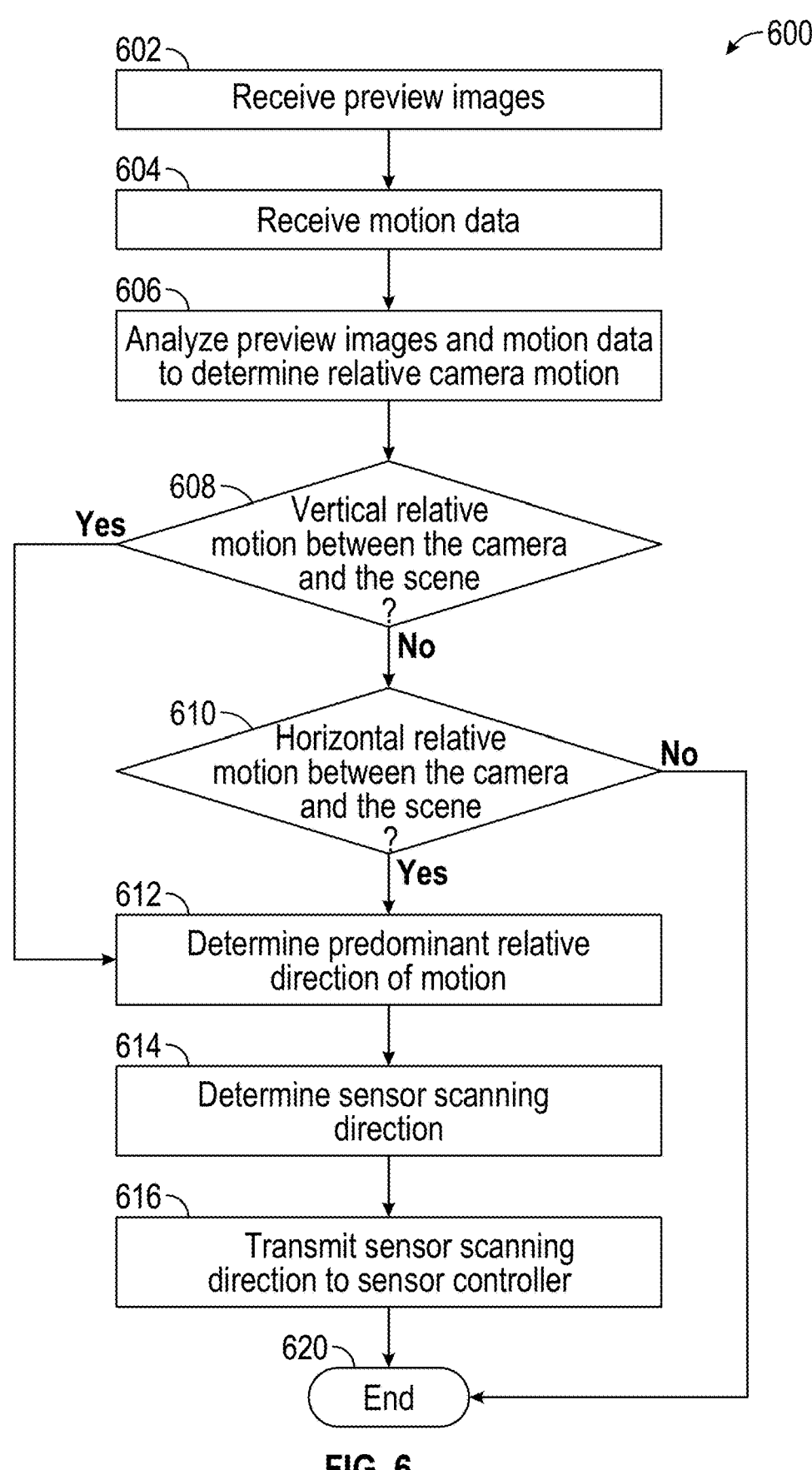
FIG. 6 is a flowchart of a process for determining an optimal image sensor scanning direction, in accordance with some embodiments of this disclosure.

FIG. 6 is a flowchart of a process 600 for determining an optimal image sensor scanning direction for use in minimizing or eliminating rolling shutter effect, in accordance with some embodiments of this disclosure. Although the present disclosure may describe certain steps of process 600 (and of other processes described herein) as being implemented by certain components of the system of FIG. 10, this is for purposes of illustration only. It should be understood that other components of the system of FIG. 10 may implement those steps instead.

In some embodiments, process 600 may be used to mitigate the rolling shutter artifacts of CMOS image sensors by dynamically modifying the exposure and readout sequence of the sensor's pixels, thereby reducing the time differences of target pixels, to avoid or minimize artifacts.

At 602, controller 101 causes image sensor 102 to receive preview images of a scene. The preview images may be still images or video images captured by the same image sensor of a camera (e.g., camera 100, or another camera, such as computing device 1000 of FIG. 10, which may or may not include adjustable transparency layer 104) that is used to capture a final image (e.g., an image to be more permanently stored). Alternatively, or in addition, the preview images may be images or data captured by a different image sensor or a different type of sensor, such as a LIDAR sensor, an event camera, and the like. In an embodiment, the preview images are captured on an ongoing basis while a camera is in use. In some embodiments, the preview images may be stored in a buffer memory for temporary access. When the buffer is full, the oldest images may be overwritten with newer images to allow the buffering of up-to-date preview images.

At 604, motion data is received. The motion data is data relating to the motion of a camera with respect to a present scene within two-dimensional or three-dimensional space. In an embodiment, the motion data is received from motion sensors, e.g., motion sensors 1016 of FIG. 10, that include at least one of an accelerometer, a visible or non-visible light motion sensor, a Global Positioning System (GPS) receiver, a low resolution sensor, a low dynamic range sensor, or any other suitable device for detecting directional motion of the camera.

At 606, the preview images, the motion data, or both are analyzed to determine a relative motion between the camera and the scene, or relative camera motion. In an embodiment, the analysis includes comparing subsequent preview images or a series of preview images over a predetermined period of time to identify objects depicted in different positions within the preview images. For example, if a first preview image contains a vertical pole in the rightmost fifth of the image, and a second preview image contains the vertical pole, identified as the same vertical pole as shown in the first preview image, now positioned in the second to rightmost fifth of the image, it may be determined that a right to left relative camera motion is to be anticipated during an image capture.

The motion data can indicate how a camera is traveling through three-dimensional space, including values and changes of camera orientation, direction, speed, and altitude. In an embodiment, both preview images and motion data are used to determine relative camera motion. For example, if a camera is situated within a first moving train and directed toward a scene that includes a second moving train traveling in the opposite direction, analysis of only the motion data from a GPS receiver without additional preview image data would indicate that the camera is moving at a slower speed relative to the second moving train than data from a preview image would indicate. Thus, implementing analysis of both the preview images and the motion data can provide a more accurate representation of the relative camera motion than relying on motion data alone.

At 608, based on the analysis of the preview images and the motion data, it is determined whether a vertical relative motion is present between the camera and the scene. If so, the process continues at 612. If not, the process continues at 610, where it is determined whether horizontal relative motion is present between the camera and the scene. If not, the process ends at 620. If it is determined that horizontal relative motion is present, the process continues at 612.

At 612, a predominant relative direction of motion between the camera and the scene is determined, e.g., based on the processing performed at 602-610. In an embodiment, the predominant relative direction of motion is determined by analyzing the relative camera motion and determining a value for each direction within a two-dimensional plane that is coplanar with the image sensor. For example, it may be determined that, relative to the scene and with respect to a two-dimensional plane that is coplanar with the image sensor, the camera is moving diagonally in an upward and rightward direction. If the determined relative camera motion indicates that 80% of the relative camera motion is horizontally rightward and 20% of the relative camera motion is vertically upward, the predominant relative direction of motion of the camera relative to the scene is determined to be horizontally rightward. In another example, the controller 101 of FIG. 1 or 1010 of FIG. 10, determine based on the motion data that the camera is moving entirely horizontally and the predominant motion is determined to be horizontal, or entirely vertically and the predominant motion is determined to be vertical. It should be noted that in alternative embodiments, the relative direction of motion can be determined as the relative direction of motion of the scene relative to the camera.

At 614, an optimal sensor scanning direction is determined based on the predominant relative direction determined in step 612. In an embodiment, the optimal sensor scanning direction is determined by evaluating four options of image sensor scanning directions: (1) a vertical scanning direction comprising scanning horizontal rows of the image sensor from a top row to a bottom row, (2) a vertical scanning direction comprising scanning horizontal rows of the image sensor from a bottom row to a top row, (3) a horizontal scanning direction comprising scanning vertical columns of the image sensor from a left column to a right column, and (4) a horizontal scanning direction comprising scanning vertical columns of the image sensor from a right column to a left column, wherein the evaluating includes determining one image scanning direction of the four options of image scanning directions that aligns with the predominant relative direction more than the remaining three image scanning directions. In an embodiment, the optimal scanning direction is the direction that is closest among the four options of image sensor scanning directions to align with the predominant relative direction of motion determined at 612. For example, controller 101 may compare the predominant relative direction of motion determined at 612 to one or more of options (1)-(4) or any other suitable options, and determine a closest match from amongst such options. Following the example above, if the relative direction of motion in a two-dimensional plane is determined to be 80% horizontally rightward and 20% vertically upward, the predominant relative direction of motion is determined to be horizontally rightward and the optimal scanning direction selected will be option (4), a horizontal scanning direction comprising scanning vertical columns of the image sensor from a right column to a left column. In an embodiment, the predominant relative direction is a two-dimensional vector containing both a horizontal motion component and a vertical motion component. Each of the horizontal motion component and the vertical motion component are assigned a positive or negative value. For example, a positive value indicates an upward or rightward motion, and a negative value indicates a downward or leftward motion. A determination of the optimal sensor scanning direction is based on the component having the largest absolute value. In this embodiment, a separate determination of a vertical relative motion and a horizontal relative motion is not necessary in the determination of the optimal sensor scanning direction.

At 616, the determined optimal sensor scanning direction is transmitted to an image sensor controller. In an embodiment, the image sensor controller is a component of the camera and is configured to control which image sensor scanning direction is implemented when an image is captured. The image sensor controller, e.g., controller 102 of FIG. 1 or sensor controller 1010 of FIG. 10, can adjust the image sensor scanning direction for each individual image captured by the camera. As will be discussed further below, applying a sensor scanning direction while a camera is moving can result in an output image with additional distortions, such as an image that is compressed or extended, and additional processing may be performed to correct any distortions introduced in the disclosed method.

Figure 7:
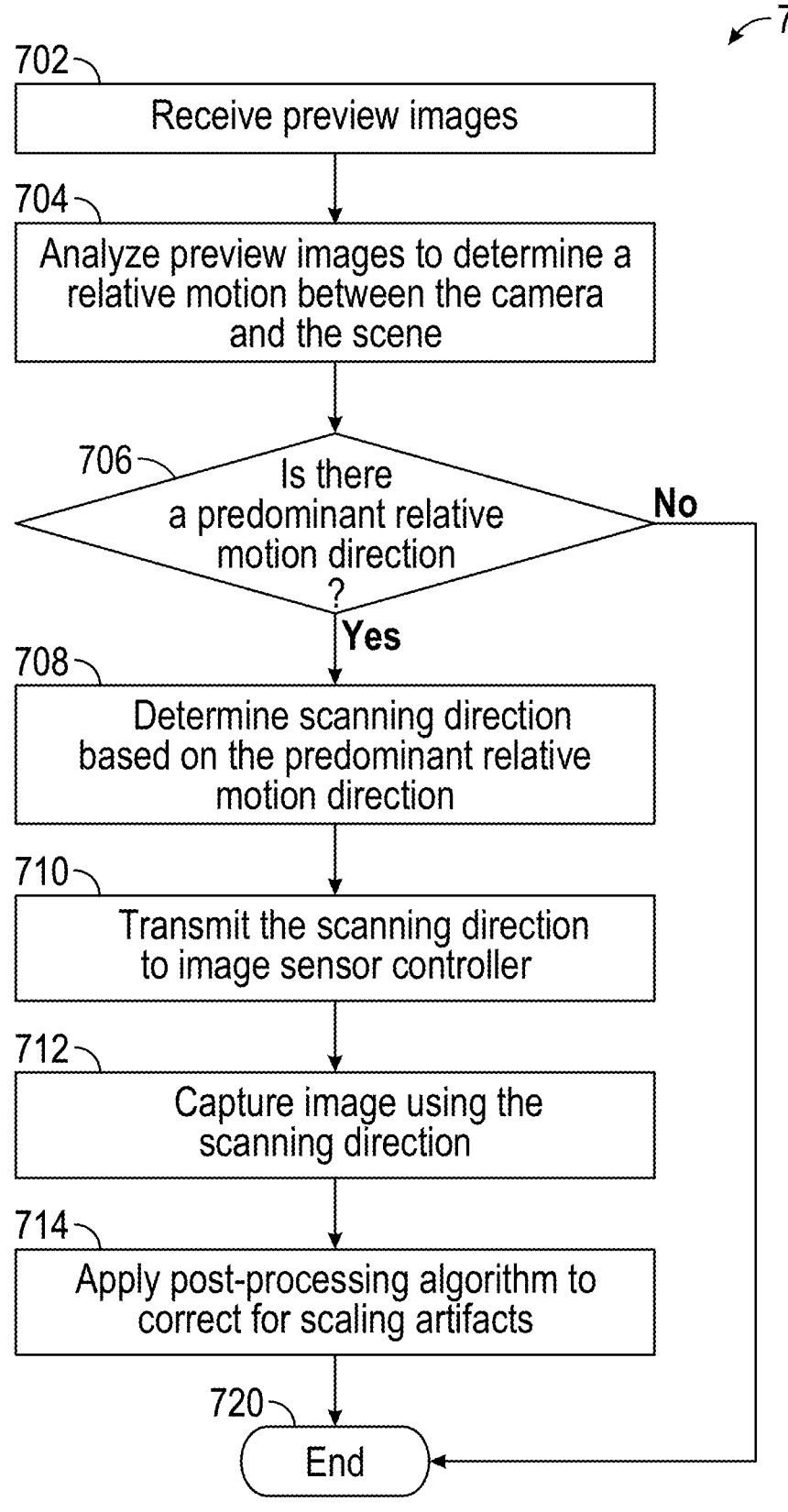
FIG. 7 is a flowchart of an additional process for determining an optimal image sensor scanning direction, in accordance with some embodiments of this disclosure.

FIG. 7 is a flowchart of a process 700 for determining an optimal image sensor scanning direction, in accordance with some embodiments of this disclosure.

At 702, the preview images are received. The preview images may be still or video images captured by the same image sensor of a camera that is used to capture a final image, or captured by a different image sensor or a different type of sensor, such as a LIDAR sensor, an event camera, and the like. In an embodiment, the preview images are captured on an ongoing basis while a camera is in use. The preview images may be stored in a buffer memory for temporary access. When the buffer is full, the oldest images are overwritten with newer images to allow the continuous buffering of up-to-date preview images. In a further embodiment, additional data is received relating to the motion of the camera, e.g., from an IMU, an accelerometer, or devices configured to provide information relating to the motion of the camera relative a present scene.

At 704, the preview images are analyzed to determine a relative camera motion. In an embodiment the analysis includes comparing subsequent preview images or a series of preview images over a predetermined period of time to identify objects depicted in different positions within the preview images. In a further embodiment, the additional data relating to the motion of the camera is analyzed in addition to, or in place of, the preview images to determine the relative camera motion.

At 706, it is determined whether there is a predominant relative direction of motion between the camera and the scene. In an embodiment, the predominant relative direction of motion is determined by analyzing the relative camera motion and determining a value for each direction within a two-dimensional plane that is coplanar with the image sensor. For example, a controller determines the camera is moving diagonally in an upward and rightward direction relative to the scene and with respect to a two-dimensional plane that is coplanar with the image sensor. If the relative motion indicates that 80% of the motion is horizontally rightward and 20% of the motion is vertically upward, the predominant relative direction of motion is determined to the horizontally rightward. If there is no predominant relative direction of motion, the process ends at 720. If there is a predominant relative direction of motion, the process continues at 708.

At 708, an optimal scanning direction is determined based on the predominant relative direction of motion. In an embodiment, the optimal sensor scanning direction is determined by comparing four options of image sensor scanning directions: (1) a vertical scanning direction comprising scanning horizontal rows of the image sensor from a top row to a bottom row, (2) a vertical scanning direction comprising scanning horizontal rows of the image sensor from a bottom row to a top row, (3) a horizontal scanning direction comprising scanning vertical columns of the image sensor from a left column to a right column, and (4) a horizontal scanning direction comprising scanning vertical columns of the image sensor from a right column to a left column. In an embodiment, the optimal scanning direction is the direction that is the most aligned with the predominant relative direction of motion of the camera relative to the scene.

At 710, the determined optimal sensor scanning direction is transmitted to an image sensor controller. In an embodiment, the image sensor controller is a component of the camera and is configured to control which image sensor scanning direction is implemented when an image is captured. At 712 the image is captures using the determined optimal scanning direction, and at 714, a post-processing algorithm based on the sensor scanning direction is applied to correct any scaling artifacts, such as compression or expansion in the output image, due to the applied optimal sensor scanning direction.

Figure 8:
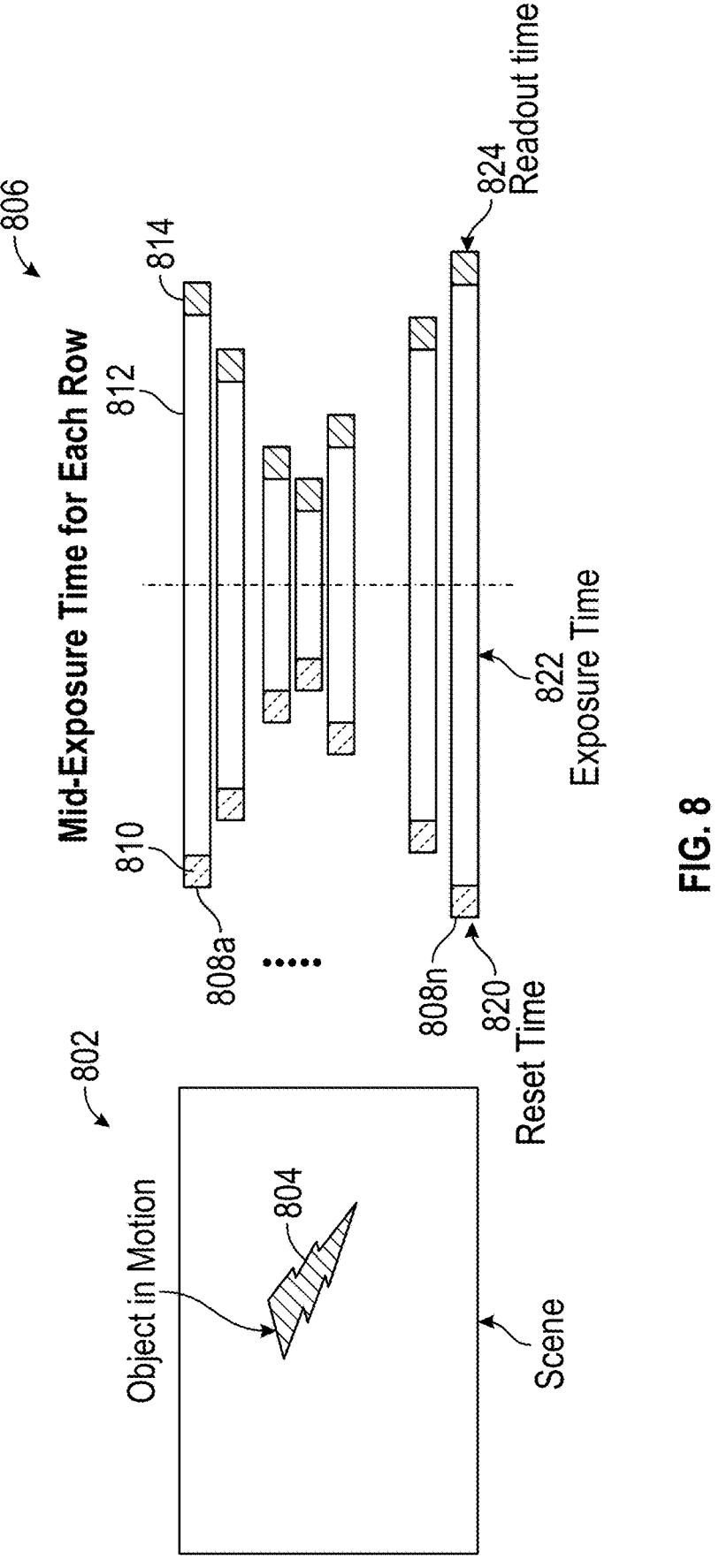
FIG. 8 shows an illustrative image scene and sensor portion exposure graph relating to an object in motion, in accordance with some embodiments of this disclosure.

FIG. 8 shows an illustrative image scene 802 and a sensor portion exposure graph 806 relating to an object in motion, in accordance with some embodiments of this disclosure. In the illustrative image scene 802, an object in motion 804 is depicted in a central area of the scene. The sensor portion exposure graph 806 corresponds to horizonal rows of an image sensor used to capture an image of the scene. The sensor portion exposure graph 806 includes a plurality of sensor rows 808a-808n, collectively referred to as sensor rows 808. A time graph for each of the plurality of sensor rows 808 includes a reset time 820, an exposure time 822, and a readout time 824. In the disclosed method, a preview image of the scene 802 is captured and analyzed to identify any objects in motion depicted therein. The preview images can be further analyzed to determine a speed of the object in motion, and based on a determined speed, an exposure time that ensures motion blur for the captured object in motion is maintained below a predetermined threshold. In an embodiment, such an exposure time is designated as an optimal exposure time.

In an embodiment, an exposure time for each of the plurality of sensor rows 808 of the image sensor is calculated, where the exposure time is shorter for sensor portions capturing the object in motion than for sensor portions not capturing the object in motion. A midpoint of each of the calculated exposure times for each of the plurality of sensor rows 808 is determined, where the midpoint is between a start exposure time of the calculated exposure time and an end exposure time for the calculated exposure time for each respective sensor row, and a first time between the start exposure time and the midpoint is equal or within a predetermined threshold to a second time between the midpoint and the end exposure time.

In an embodiment, the midpoints of each of the plurality of sensor rows 808 are aligned such that during an image capture, the midpoint exposure times occur simultaneously. In some embodiment, a post-processing algorithm is implemented to compensate for the varying exposure times across the different sensor rows 808 to ensure consistent brightness across the sensor. In a further embodiment, the midpoints of each of the plurality of sensor rows 808 are aligned within a predetermined threshold, e.g., the exposure times of each of the plurality of sensor rows are aligned such that the duration of time between the earliest midpoint and latest midpoint of the exposure times does not exceed 15% of the longest exposure time.

Figure 9:
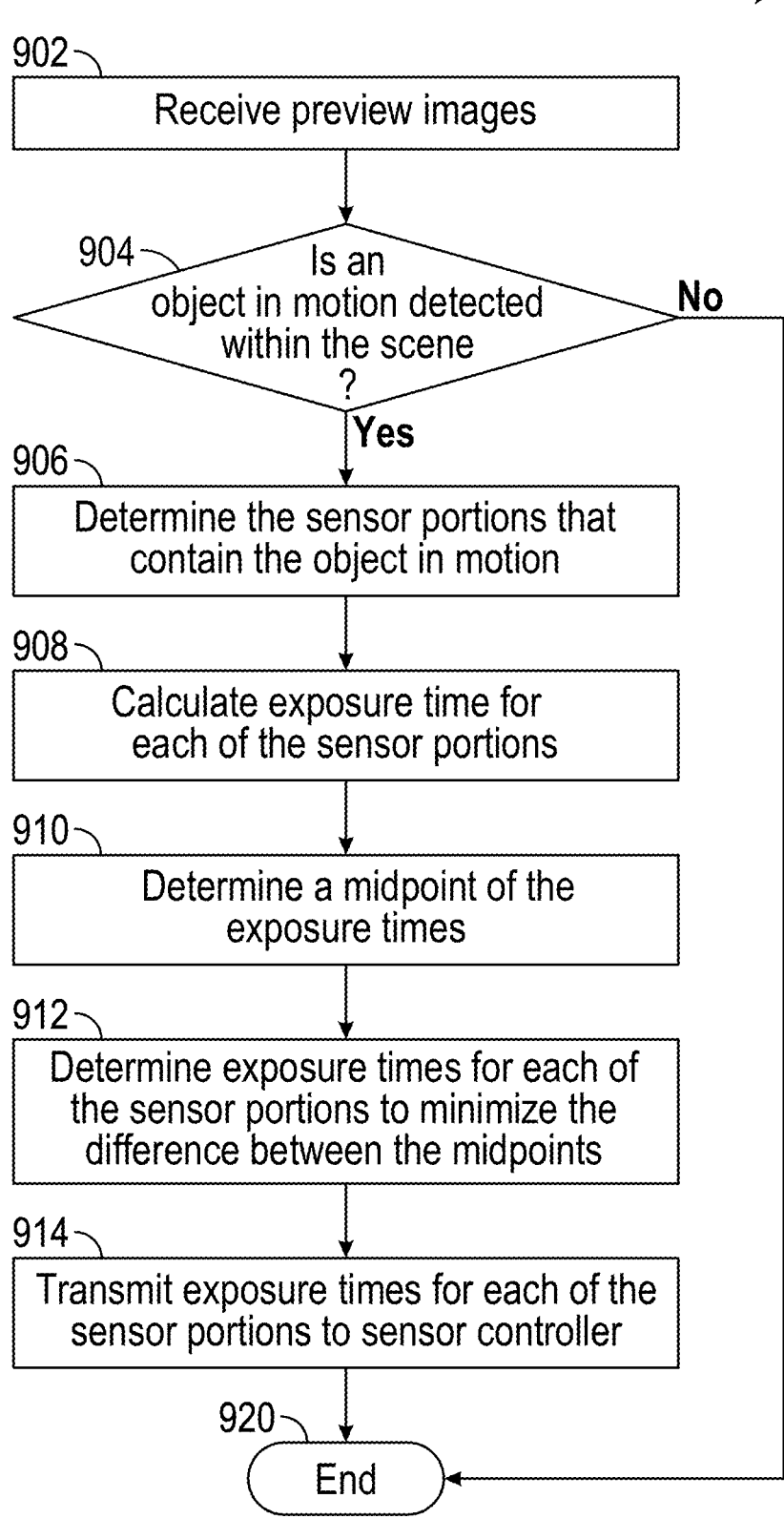
FIG. 9 is a flowchart of a process for determining exposure times and midpoints of the exposure times, in accordance with some embodiments of this disclosure.

FIG. 9 is a flowchart of a process 900 for determining exposure times and midpoints of the exposure times, in accordance with some embodiments of this disclosure.

At 902, the preview images of a scene are received. The preview images may be still or video images captured by the same image sensor of a camera that is used to capture a final image, or they may be images or data captured by a different image sensor or a different type of sensor, such as a LIDAR sensor, an event camera, and the like. In an embodiment, the preview images are captured on an ongoing basis while a camera is in use. The preview images may be stored in a buffer memory for temporary access. When the buffer is full, the oldest images are overwritten with newer images to allow the continuous buffering of up-to-date preview images.

At 904, it is determined whether an object in motion is detected within the scene. If not the process ends at 920. If so, the process continues at 906. At 906, the portions of the image sensor that will be used to capture the identified object in motion are determined, and at 908, optimal exposure times for each of the portions of the image sensor is calculated.

At 910, a midpoint of each of the optimal exposure times for each of the portions of the image sensor is determined, and, at 912, exposure times for each of the sensor potions that minimize the difference between the midpoints are determined and transmitted, at 914, to an image sensor controller. In an embodiment, the exposure time length changes between neighboring rows is additionally determined and minimized in order to minimize any differences of exposure, as well as brightness, between adjacent rows. The process ends at 920.

Figure 10:
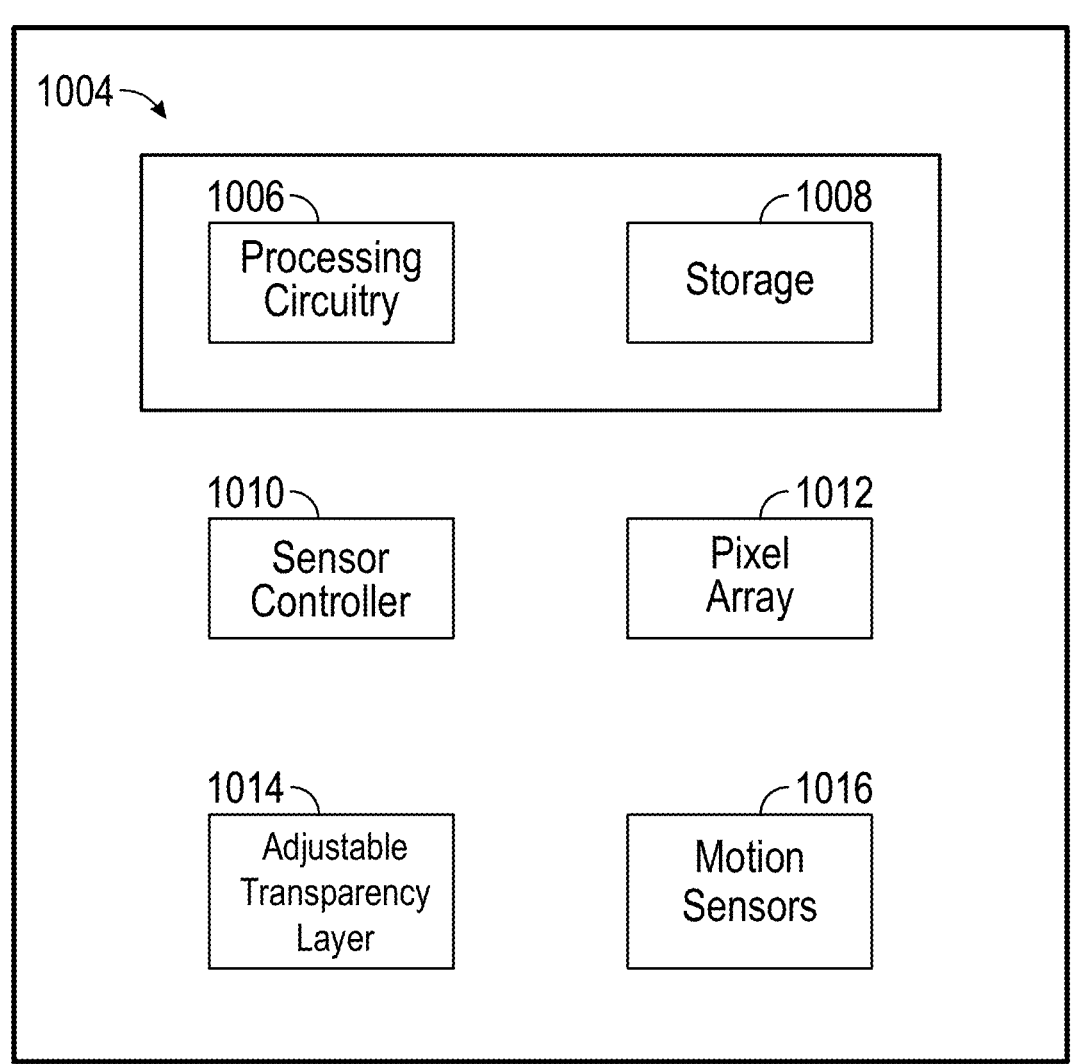
FIG. 10 is a block diagram of a device for correcting rolling shutter effect, in accordance with some embodiments of this disclosure.

FIG. 10 is a block diagram of a computing device 1000 for correcting rolling shutter effect, in accordance with some embodiments of this disclosure. In some embodiments, computing device 1000 may comprise one or more cameras, e.g., one or more stand-alone cameras and/or one or more cameras integrated in another device (e.g., a smartphone, tablet, an extended reality (XR) device, or any other suitable device having or being in communication with a camera). In some embodiments, controller 101 may correspond to processing circuitry 1006 and/or sensor controller 1010. The computing device 1000 may include one or more circuit boards 1004. In some embodiments, the circuit boards may include sensor controller 1010, processing circuitry 1006, and storage 1008 (e.g., RAM, ROM, hard disk, removable disk, etc.). In some embodiments, the computing device 1000 may comprise any suitable number of sensors (e.g., accelerometer, light detector, motion detector, gyroscope, and the like), and/or a GPS module (e.g., in communication with one or more servers and/or satellites) to ascertain a location and a motion of computing device 1000. In some embodiments, computing device 1000 comprises a rechargeable battery that is configured to provide power to the components of the computing device.

In some embodiments, the computing device 1000 includes a sensor controller 1010 configured to transmit instructions to an image sensor (not shown) regarding the timing and method of exposing the image sensor portions, as discussed further in the methods of FIGS. 2, 6, 7, and 9. In further embodiments, the computing device 1000 is connected to the pixel array 1012 of the image sensor, to an adjustable transparency layer 1014 for controlling an effective exposure time, and to additional motion sensors 1016, such as accelerometers, LIDAR sensors, or event cameras that are distinct from the image sensor, as further discussed above.

As referred to herein, processing circuitry 1006 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, processing circuitry 1006 executes instructions for reducing rolling shutter effect in image capture by an imaging application stored in memory (e.g., storage 1008). Specifically, processing circuitry 1006 may be instructed by the imaging application to perform the functions discussed herein.

Memory may be an electronic storage device provided as storage 1008 that is part of circuit boards 1004. As referred to herein, the phrase "electronic storage device" or "storage device" should be understood to mean any device for storing electronic data, computer software, or firmware, such as random-access memory, read-only memory, hard drives, solid state devices, quantum storage devices, digital cameras, mobile phones, or any other suitable fixed or removable storage devices, and/or any combination of the same. Storage 1008 may be used to store various types of content described herein as well as imaging application data described above. Nonvolatile memory may also be used (e.g., to launch a boot-up routine and other instructions).

Circuit boards 1004 may also include digital-to-analog converter circuitry and analog-to-digital converter circuitry for converting between digital and analog signals.

The imaging application may be implemented using any suitable architecture. For example, it may be a stand-alone application wholly implemented on computing device 1000. In such an approach, instructions of the application may be stored locally (e.g., in storage 1008), and data for use by the application is downloaded on a periodic basis (e.g., from the imaging sensor of a digital camera).

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for enabling mitigation of rolling shutter effect for an image captured by a camera, the method comprising:

initiating a capture of an image by a camera, wherein the camera comprises a lens, an adjustable transparency layer, and an image sensor;

determining an earliest readout time of one of a plurality of sensor portions of the image sensor; and adjusting a transparency level of the adjustable transparency layer to manipulate exposure start times and exposure stop times for an exposure interval during which the image sensor is exposed to light from the lens wherein the manipulated exposure stop time occurs no later than the earliest readout time of any of the plurality of sensor portions.

2. The method of claim 1, wherein the plurality of sensor portions of the image sensor are each configured to record incoming light during an exposure interval, and wherein the exposure interval for each respective sensor portion of the plurality of sensor portions is preceded by a reset time and followed by a readout time, the method further comprising:

determining the earliest readout time by comparing the readout times of each respective sensor portion of the plurality of sensor portions.

3. The method of claim 1, further comprising:

determining that a transmittance rate of incoming light exceeds a predefined threshold; and based on determining that the transmittance rate of incoming light exceeds a predefined threshold, issuing a reset control to each of the plurality of sensor portions of the image sensor simultaneously to cause each of the plurality of sensor portions of the image sensor begin to be exposed to the incoming light concurrently.

4. The method of claim 1, wherein adjusting the transparency level of the adjustable transparency layer occurs no later than the earliest readout time of any of the plurality of sensor portions creates an effective exposure time that is equal in duration for each of the plurality of sensor portions.

5. The method of claim 1, wherein the plurality of sensor portions of the image sensor are each configured to initiate an exposure interval after receiving a reset time command, and wherein the exposure interval is followed by a readout time interval for processing data generated over the exposure interval.

6. The method of claim 1, where the plurality of sensor portions comprise either a plurality of sensor rows or a plurality of sensor columns.

7. The method of claim 1, wherein the camera further comprises an image sensor controller, and wherein initiating the capture of the image comprises causing the image sensor controller to expose each of the plurality of sensor portions of the image sensor to incoming light.

8. The method of claim 7, further comprising:

synchronizing the adjustable transparency layer with the plurality of sensor portions;

causing each of the plurality of sensor portions to simultaneously begin a start exposure time; and causing the synchronized adjustable transparency layer to adjust transparency to allow passage of incoming light at the start exposure time.

9. The method of claim 8, wherein the image sensor controller is further configured to adjust the transparency of the adjustable transparency layer.

10. The method of claim 1, wherein the adjustable transparency layer is comprised of polymer-dispersed liquid crystals (PDLC).

11. A device comprising:

a lens;

an adjustable transparency layer;

an image sensor;

a memory; and control circuitry configured to:

initiate a capture of an image by the device;

determine an earliest readout time of one of a plurality of sensor portions of the image sensor; and adjust a transparency level of the adjustable transparency layer to manipulate exposure start times and exposure stop times for an exposure interval during which the image sensor is exposed to light from the lens wherein the manipulated exposure stop time occurs no later than the earliest readout time of any of the plurality of sensor portions.

12. The device of claim 11, wherein the plurality of sensor portions of the image sensor are each configured to record incoming light during an exposure interval, and wherein the exposure interval for each respective sensor portion of the plurality of sensor portions is preceded by a reset time and followed by a readout time, the control circuitry further configured to:

determining the earliest readout time by comparing the readout times of each respective sensor portion of the plurality of sensor portions.

13. The device of claim 11, wherein the control circuitry is further configured to:

determine that a transmittance rate of incoming light exceeds a predefined threshold; and based on determining that the transmittance rate of incoming light exceeds a predefined threshold, issue a reset control to each of the plurality of sensor portions of the image sensor simultaneously to cause each of the plurality of sensor portions of the image sensor begin to be exposed to the incoming light concurrently.

14. The device of claim 11, wherein adjusting the transparency level of the adjustable transparency layer occurs no later than the earliest readout time of any of the plurality of sensor portions creates an effective exposure time that is equal in duration for each of the plurality of sensor portions.

15. The device of claim 11, wherein the plurality of sensor portions of the image sensor are each configured to initiate an exposure interval after receiving a reset time command, and wherein the exposure interval is followed by a readout time interval for processing data generated over the exposure interval.

16. The device of claim 11, where the plurality of sensor portions comprise either a plurality of sensor rows or a plurality of sensor columns.

17. The device of claim 11, wherein the device further comprises an image sensor controller, and wherein initiating the capture of the image comprises causing the image sensor controller to expose each of the plurality of sensor portions of the image sensor to incoming light.

18. The device of claim 17, wherein the control circuitry is further configured to:

synchronize the adjustable transparency layer with the plurality of sensor portions;

cause each of the plurality of sensor portions to simultaneously begin a start exposure time; and cause the synchronized adjustable transparency layer to adjust transparency to allow passage of incoming light at the start exposure time.

19. The device of claim 18, wherein the image sensor controller is further configured to adjust the transparency of the adjustable transparency layer.

20. The device of claim 11, wherein the adjustable transparency layer is comprised of polymer-dispersed liquid crystals (PDLC).

\* \* \* \* \*